Feb. 1, 1944.   O. A. HANSEN   2,340,747
METHOD AND APPARATUS FOR PUMPING VOLATILE LIQUIDS WITH ROTARY ELEMENTS
Filed July 13, 1940   6 Sheets-Sheet 1

INVENTOR
Odd A. Hansen
BY
Watson, Bristol, Johnson & Leavenworth
ATTORNEYS Feb. 1, 1944.    O. A. HANSEN    2,340,747
METHOD AND APPARATUS FOR PUMPING VOLATILE LIQUIDS WITH ROTARY ELEMENTS
Filed July 13, 1940    6 Sheets-Sheet 4

INVENTOR
Odd A. Hansen
BY Watson, Bristol, Johnson & Leavenworth
ATTORNEYS

INVENTOR
Odd A. Hansen
BY Watson, Bristol, Johnson & Leavenworth
ATTORNEYS

Patented Feb. 1, 1944

2,340,747

UNITED STATES PATENT OFFICE 2,340,747

METHOD AND APPARATUS FOR PUMPING VOLATILE LIQUIDS WITH ROTARY ELEMENTS

Odd A. Hansen, Kenmore, N. Y., assignor to The Linde Air Products Company, New York, N. Y., a corporation of Ohio Application July 13, 1940, Serial No. 345,308

11 Claims. (Cl. 62—1)

This invention relates to a method and apparatus of the rotary type for pumping a volatile liquid, and particularly to such pumping when the liquid is a liquefied gas having a relatively low boiling point temperature at atmospheric pressure, for example, one below 233° K., such as is had by liquid oxygen.

The invention has for its object generally the provision of an improved combination of pumping steps and suitable pumping apparatus, whereby such liquid may be transferred or positively pumped by means of a rotary pump, such as a turbine pump, and discharged against a moderate head of pressure; for example, against a head of from about atmospheric to 150 pounds per square inch gauge, without the pumping apparatus becoming gas-bound.

More specifically, the invention has for its object the provision of a set of pumping steps together with improved rotary pumping apparatus for effecting such steps whereby a volatile liquid, such as liquid oxygen, may be pumped with rotary motion in one or more stages while at the same time excluding the heat from the surrounding environment, such as from the atmosphere, which would operate to vaporize the liquid and cause the pump to become gas-bound.

Structurally, an object of the invention is to provide a rotary pump of the character indicated which has a minimum of lubricated parts and is arranged to avoid the use of hydrocarbon or other lubricants, which would in any way be detrimental to the liquid being pumped, or which could form dangerous or objectionable compounds therewith.

Another object is to provide a turbine type rotary pump with a pumping channel adapted to pump a volatile liquid of relatively low viscosity without undue leakage and without turbulence at the inlet, such as would cause the pump to become gas-bound.

Still another object is to provide a turbine pump casing which has but one external bearing for the rotor shaft, such bearing being preferably removed a relatively great distance from the rotor so as to avoid being unduly cooled and having its working efficiency reduced by the low temperature of the liquid being pumped.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Where a nearly boiling liquid is to be transferred or positively pumped, for example, in pipe-lines, against a moderate head of pressure rotary pumping apparatus is advantageous by reason of the relatively small positive suction head required, and also on account of its relatively high capacity for the size of the apparatus. There are, however, certain conditions to be met in order that pumps in general in such service may operate, which are known and taught in the U. S. patent to Thompson, No. 1,930,731. In this patent, two reciprocating pumps are provided in series, i. e., a first-stage or fore pump is arranged to discharge into a second-stage pump, the arrangement being such that the first-stage pump supplies the volatile liquid being pumped to the second pump under a non-equilibrium pressure or head sufficient to suppress ebullition of the liquid in the second-stage pump. Such condition is also necessarily met in the first-stage pump.

In rotary pumps of the present invention, such pressure may be readily had by any one of several means known to the art; for example, the container which supplies the liquid to be pumped may be positioned to have a sufficient static head to provide the desired pressure; a container with evaporating coil as taught in U. S. patent to Heylandt, Re. 18,876, or a combination of these means may be used.

It will be seen that such rotary pump may be used as a fore pump with a second-stage pump to provide a desired inlet pressure for the latter provided a sufficient non-equilibrium pressure prevails at the inlet of the rotary pump.

In the rotary pump itself, liquid is transferred against a head of pressure by causing the liquid to travel at a relatively high velocity and then converting this velocity into pressure. The centrifugal pump is a more common type of pump of this character and it is usual to arrange centrifugal pumps so as to have an inlet entering at the side of the impeller that works in a pressure building channel, which is often tapered and spiral in form. Impellers in these pumps generally convey relatively large volumes of liquid and may have vanes of substantially any convenient shape, for example, straight, radial, or curved either forwards or backwards.

The turbine pump, while it belongs to the general rotary class of pumps, has been developed for rotary pumping, where centrifugal and other types cannot readily operate and which cannot handle highly volatile or nearly boiling liquids. Turbine type pumps are also adapted to serve as rotary pumps where but small capacity is desired and have generally higher discharge heads per stage than centrifugal pumps. This takes place probably because the turbine type pump employs an annular passage of nearly uniform cross-section through which a toothed or straight bladed impeller is rotated. The suction and discharge ports are connected directly to the annular passage and are separated by a barrier in the passage recessed sufficiently to provide a groove large enough to pass the impeller.

The straight bladed impeller or toothed wheel carries liquid along by its blades, partly by the frictional drag on the liquid and partly by the effect of centrifugal force which acts during rotation to throw the liquid into the channel. The velocity of the liquid thrown off by the impeller is apparently then converted into pressure in the channel, this taking place in a relatively short distance around the periphery of the channel. When the velocity head is substantially converted into pressure the liquid flows toward the innermost part of the channel and is again picked up by the impeller to repeat the cycle. While this explanation of the operation is generally accepted as the apparently correct interpretation of the facts, it may not be an exact one.

The practice of the present invention is particularly applicable to turbine type pumps, and employs a pumping channel arranged to admit the liquid to be pumped with as little turbulence as feasible. Accordingly, the inlet connection is streamlined, there being also preferably introduced in the inlet a special baffle for dividing the incoming stream so that the same may be distributed or inducted in two portions; in the present embodiment such portions are arranged one at each side of a rotary pumping element or impeller, thereby avoiding turbulence.

The spacing of the impeller teeth is advantageously related to the viscosity and when pumping a volatile liquid of less viscosity than water, such as liquid oxygen, the spacing of the impeller teeth is reduced to a distance materially less than that for water. The clearance between impeller and casing is also correspondingly reduced.

The speed at which the impeller is driven has an upper limit and, in accordance with the invention, is low enough to avoid imparting that amount of kinetic energy which converts the liquid into gas. The length of the pumping channel is made sufficient to build the desired pressure head in the liquid by the time it reaches the outlet or discharge port in the pump casing.

Referring now to the drawings, and particularly to Figs. 1 to 4, a double-walled transport container is shown at A and is of a character adapted for transporting over rails relatively large quantities of volatile liquid, such as liquid oxygen. The container is here depicted at a consuming installation where such liquid is to be dispensed and for this purpose is disposed relatively to a pump B, here shown as of the turbine type, to provide a sufficient non-equilibrium pressure, which is here had from the static head to suppress ebullition while pumping. Such pump may or may not be insulated, but, when connected as indicated, is adapted for transferring liquid from container A to a liquid receiving device C of the consuming installation against a moderate head of pressure.

Figure 2:
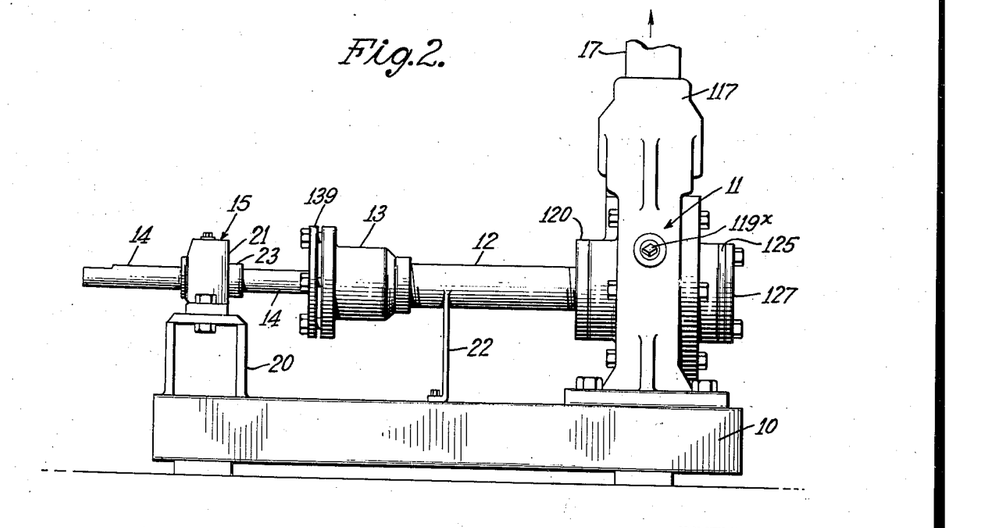
Fig. 2 is an enlarged view showing in side elevation the turbine type pump, shown in Fig. 1.
Figure 3:
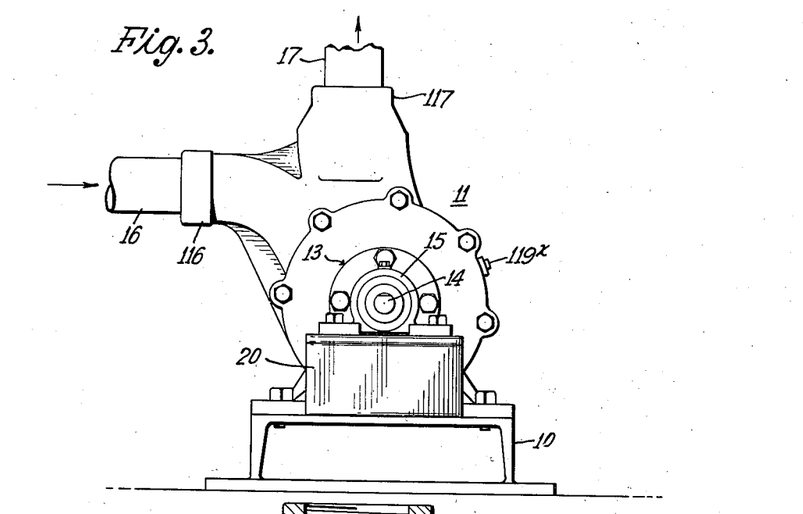
Fig. 3 is an end elevation of the pump shown in Fig. 2.

The pump B is depicted on a larger scale in Fig. 2, and is seen to comprise a base 10 on which is mounted a casing 11 having an extension 12 provided with a shaft seal or gland 13 through which a shaft 14, that revolves in the pump casing, protrudes and runs in an external bearing 15. Casing 11 has a liquid inlet connection 16 that is connected to container A, and an outlet connection 17 that is connected to receiving device C and is provided with a control valve m.

A by-pass connection having a control valve 19 is also provided and leads from the pump outlet to the gas space of container A through a connection 18; there being also preferably provided another connection 17' leading to the gas space of receiving device C, and having a control valve n. The connections shown include the usual auxiliaries, such as safety valve, pressure gauge, etc. Further details of the pump B are to be seen in Figs. 3 to 8. Here the shaft 14 is shown as carrying an impeller 130, and is adapted to be coupled mechanically for driving purposes to any suitable prime mover, such as to an electric motor (not shown).

The external bearing 15 provides independent adjustment thereof with respect to casing 11. To this end, it is mounted on a block 20 on the base 10. Such arrangement also operates to reduce the passage of heat by conduction from the bearing to liquid in the casing 11. On block 20 is mounted a bearing housing 21, the height of which may be adjusted by the insertion of shims to obtain the desired alignment of the shaft 14. Such alignment is preferably further insured by the use of a bracket interposed, as shown at 22, between the base 10 and extension 12. The actual bearing 23 in the housing 21 may be of any suitable kind, but is preferably of the so-called "antifriction" variety, such as a ball or roller bearing.

Figure 4:
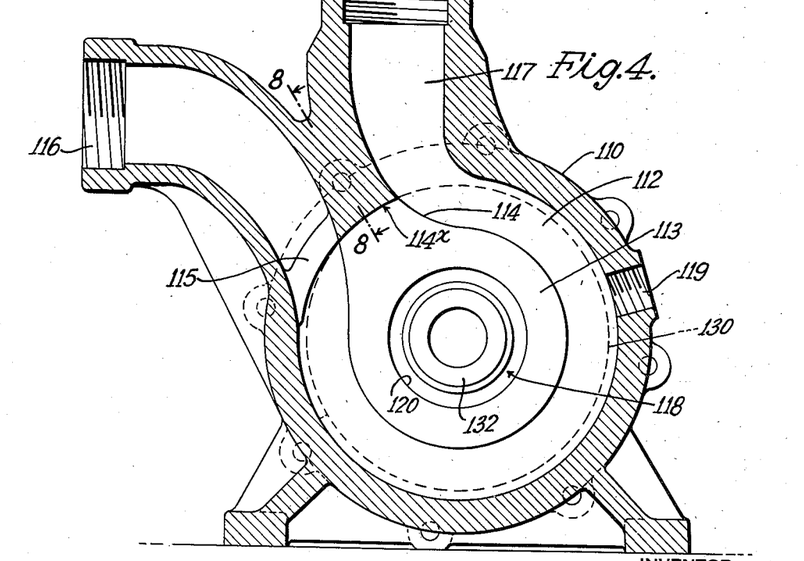
Fig. 4 is a vertical sectional view, taken on the line 4—4 of Fig. 5.
Figure 5:
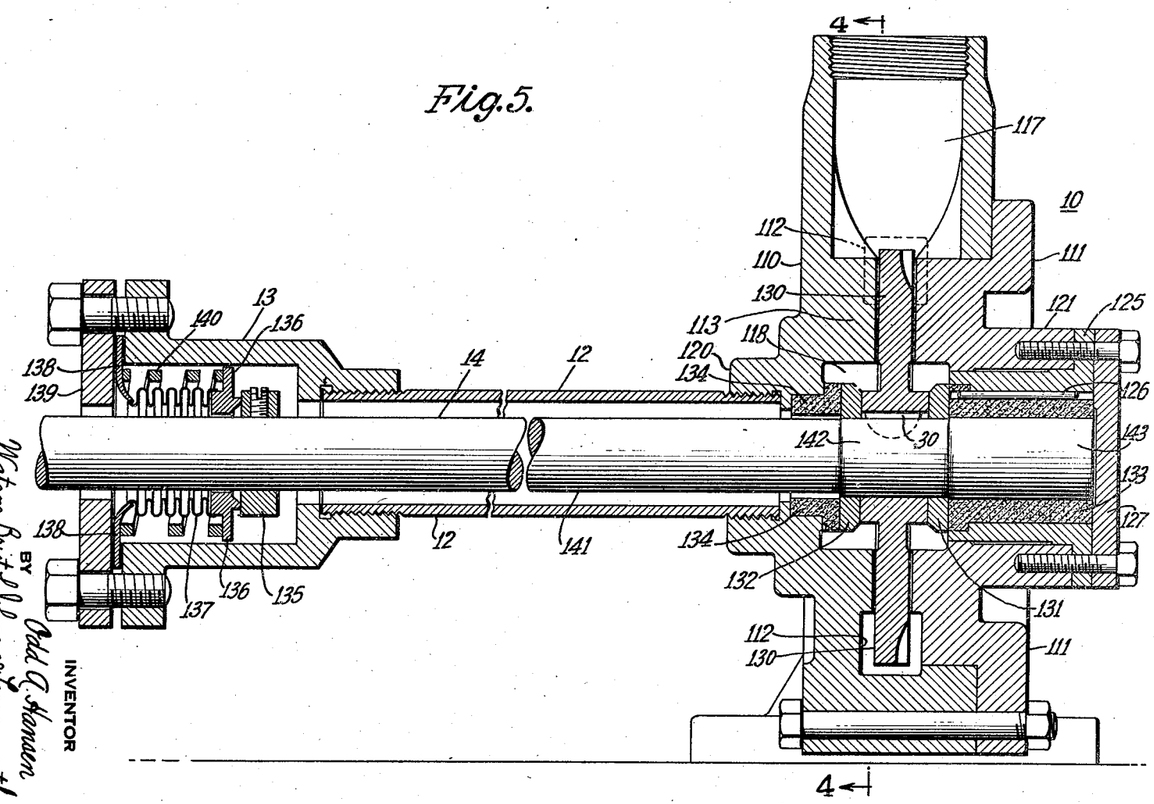
Fig. 5 is a still larger vertical sectional view of the pump shown in Fig. 2, the plane of the section passing through the axis of the pump.

In Figs. 4 and 5, details of the casing 11 are shown. Here the casing conveniently comprises two interfitting members 110 and 111 which have complementary recesses that are nearly annular and shaped to provide a circumferentially extending pumping channel 112 in which the working margin of the impeller 130 travels.

Figures 6, 7, 8:
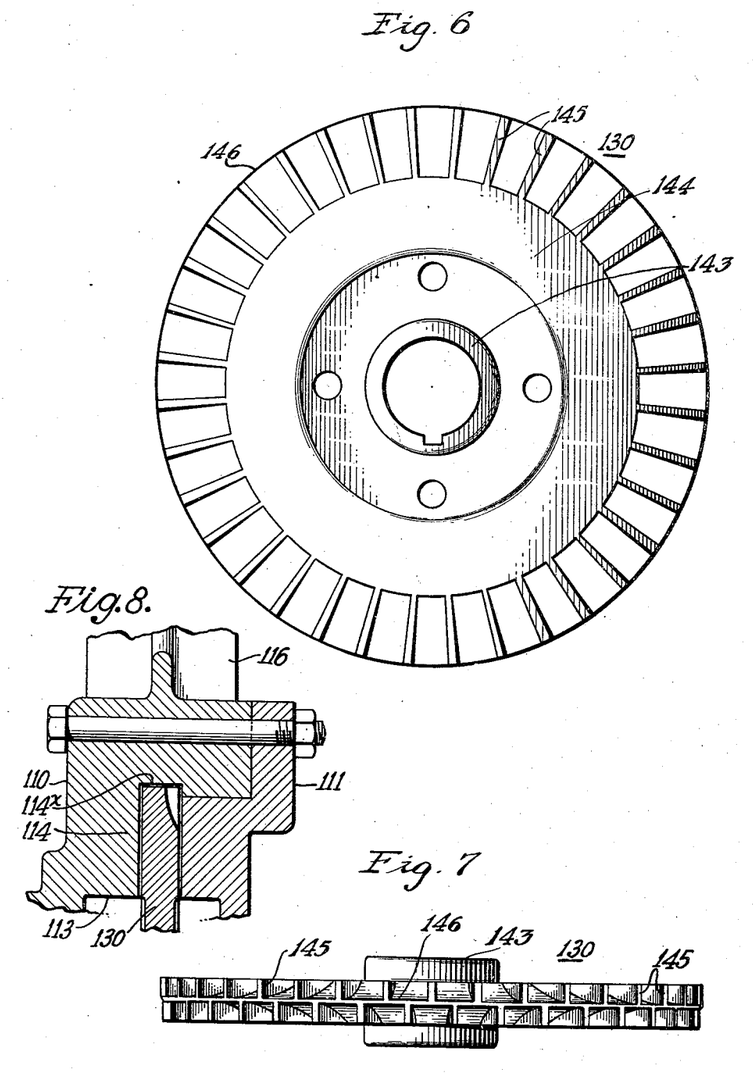
Fig. 6 is a side elevational view of the rotor or impeller element such as is employed in the pumps shown in Figs. 2 to 5.
Fig. 7 is a top plan view of the rotor shown in Fig. 6.
Fig. 8 is a fragmentary sectional view taken on the line 8—8 in Fig. 4.

The outer wall of channel 112 is formed by the wall of the casing. The inner wall, however, is formed by an annular rib member 113 provided with a barrier portion 114 extending outwardly and merging with the casing wall in order to form ends for the pumping channel and separate the inlet channel 116 from the outlet channel 117. The barrier portion 114 is itself terminated by an arcuate wall 114x which follows the edge of the impeller while its side merges into rib member 113 to form the recess which clears the impeller by a working fit. This is shown in Fig. 8, the member 111 having a complementary formation.

Circumferentially disposed across the inlet channel 116 is a baffle 115 which is preferably streamlined in cross-section for dividing the incoming stream into two portions whereby such portions enter the channel at the sides of the impeller, the inlet channel also being given a streamlined contour for reasons more fully explained below.

The central portion of the rib 113 is removed to provide a central chamber 118 for the hub of the impeller and its bearings, as hereinafter more fully described. The wall of the casing is also preferably provided with an opening at some convenient point, such as shown at 119 in Fig. 4, for inspection purposes. This opening has a convenient closure, for example, a plug 119x. The pumping channel 112 is formed with a cross-sectional shape that achieves the advance of the fluid being pumped in helical paths. Such shape may advantageously approach closely a rectangular cross-section. To give the inlet channel 116 a streamlined contour, the side wall of the barrier portion 114, which forms the inlet end of channel 112, is cut away to provide the desired contour. The outlet channel 117, however, may have any contour desired.

The shaft 14, as shown in Fig. 5, has portions of different diameters, such as successively enlarged portions shown at 141, 142, and 143. Here the last is the largest and is relatively short. Against the shoulder of portion 143 a thrust collar 131 of relatively hard metal is pressed. Against this collar the impeller 130 bears when in place, a key 30 being introduced to secure the impeller to the shaft 14. On the other side of the impeller is a second thrust collar 132 which also bears against it. Each of the collars reacts against the bearings, shown at 133 and 134 respectively. The bearing 134 has a reduced portion adapted to fit in a central recess in casing member 110, such recess being advantageously formed on the interior of a boss 120 on casing member 110 that supports the adjacent end of extension 12, such extension 12 being preferably tubular in form and having screw-threaded engagement with the boss 120. The bearings 133 and 134 thus also serve as thrust bearings and have independent support at their ends in the casing so that proper spacing for the impeller may be achieved by the use of so-called "shims." In this way, both proper clearance and centering of the impeller 130 are readily achieved in the assembly of the pump casing.

The whole of enlarged portion 143 is journaled in the bearing 133 that is shown as fitted into a flanged sleeve 125 and secured by a key 126, the sleeve being concentrically disposed in a boss 121 on casing member 111. The sleeve is preferably closed at the outer end when in place by a detachable plate 127. In the arrangement shown, the casing members 110 and 111 have interfitting recess and shoulder to insure a liquid-tight joint and proper fitting of the members. The flanged sleeve, its closing plate and the casing members are preferably held in place by bolts.

By such arrangement, the members 131, 132, and 133 serve both as journal and thrust bearings; while member 134 serves merely as a thrust bearing. Members 131 and 132 are preferably made of hardened steel, while members 133 and 134 are made of a suitable material that is both innocuous to the liquid being pumped and self-lubricating. A bonded graphite is an example of a suitable material. Lubricating passages are hence dispensed with in the arrangement provided. Such arrangement also permits the ready inspection and easy adjustment of the parts so as accurately to maintain substantially any desired clearances between casing and impeller. The joint between portions 110 and 111 of the casing 11 is also seen to admit of the insertion of shims adapted to maintain a desired distance across the space in which the impeller works.

While a bonded graphite as described above is preferred, the same is not claimed herein but is disclosed in my copending application, filed July 13, 1940, which issued on September 22, 1942, as Patent No. 2,296,640.

The other end of shaft 14 is passed to the exterior through gland 13 in the end of extension 12. This arrangement is clearly shown in Fig. 5, where a collar 135 is rigidly secured on the shaft and ground to make gas-tight engagement with a plate 136 that is secured on an expansible bellows 137 made fast in the gland through its flange 138 that is secured on the other end. Flange 138 is clamped in place by perforated end plate 139 that is secured over the end of the gland and through which the shaft 14 passes. The plate 136 is kept in place by means of a spring 140 that operates to hold the bellows distended and bears against the plate 136 and flange 138.

Details of a suitable construction for the impeller 130 are shown in Figs. 6 and 7. Here it is seen to comprise a central hub portion 143 from which extends radially outwardly a disk portion 144 in the outer edge of which are a plurality of radially disposed teeth 145. These teeth are formed in equal number on each side of a central web 146; these teeth being preferably staggered on the two sides of the web and formed with gently curved base portions such as may readily be achieved by the use of a milling cutter. These teeth have a radial depth that does not go below the edge of the inner wall of pumping channel 112, the outer end of the teeth clearing the outer wall of channel 112 by a desired distance.

The inlet channel 116 which leads into channel 112 and has a streamlined contour is arranged to converge gently down onto the sides toward the impeller teeth 145, the opposing surface of baffle 115 being curved upwardly and bounded by a streamlined surface so as to divide the incoming stream of liquid without turbulence and avoid the splashing effect that would follow direct impingement on the ends of the moving teeth. In other words, the arrangement here employed is such as to avoid turbulence at all points outside the pumping channel 112, especially extra-initial turbulence at the entrance of channel 112. The outlet 117 requires no baffle but may be streamlined if desired. In the arrangement shown, it delivers the liquid in an upward direction.

Figure 1:
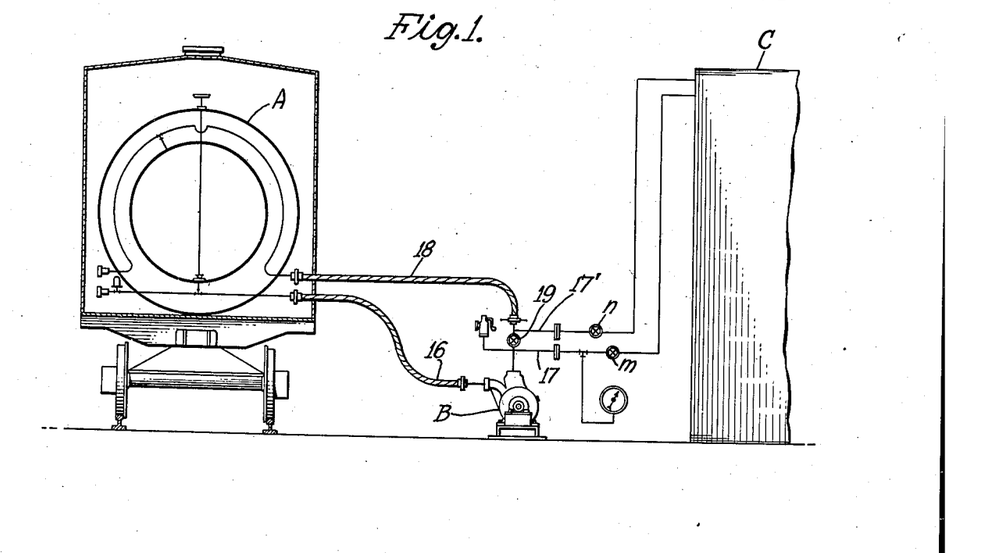
Fig. 1 is a view, partly in vertical section and partly in elevation, showing a rotary pump of the turbine type in accordance with the present invention, arranged for transferring a volatile liquid, such as liquid oxygen, to a consuming installation.

The pump just described, when in operation, may be used as a transfer pump, as illustrated in Fig. 1, or as a pipeline pump and/or as a fore pump. In any such service the pump, if not insulated, does have excessive evaporation therein until sufficient moisture from the atmosphere has condensed and frozen thereon to provide in effect an insulating envelope while in operation.

In the arrangement of Figs. 1 to 5, the inlet connection 16, when opened, permits liquid to flow into the pump. This will take place if the valve 19 be opened, since the liquid flowing in is at first gasified by reason of heat in the metal of the working parts. Such gas causes the pump to become gas-bound so that the impeller 130 when started does not pump liquid. Valves $m$ and $n$ are accordingly retained closed. The gas formed, however, collects in the upper part of the pump casing and is led off through the outlet 117 and by-pass connection 18 to the gas space in the liquid supply container, shown at A in Fig. 1. The vaporization of gas material in the pump is seen also to cool the metal of the pump; the vapor generated passing back into the container, thereby increasing the pressure on the liquid in the supply container. The liquid supply to the pump, however, remains substantially under the original static head. The evaporation continues until the pump is cooled to a temperature where no further vaporization takes place. At this juncture, the pump will circulate liquid from the inlet connection 16 through the by-pass connection 18 into the top of the supply container A. Valve $m$ is then opened and by-pass valve 19 closed, causing the liquid to flow through connection 17 to container C. The rotating impeller then entrains liquid, drawing it from the inlet connection 16 and conveying it through the channel 112 to the outlet connection 17, a desired discharge pressure head being built up in the passage of the liquid. If desired, valve $n$ may be opened to allow a flow of gas from container C to that at A; thereby reducing the pressure in the former while increasing the pressure in the latter, such pressure changes being factors tending to better the operating conditions of the pump.

Figure 10:
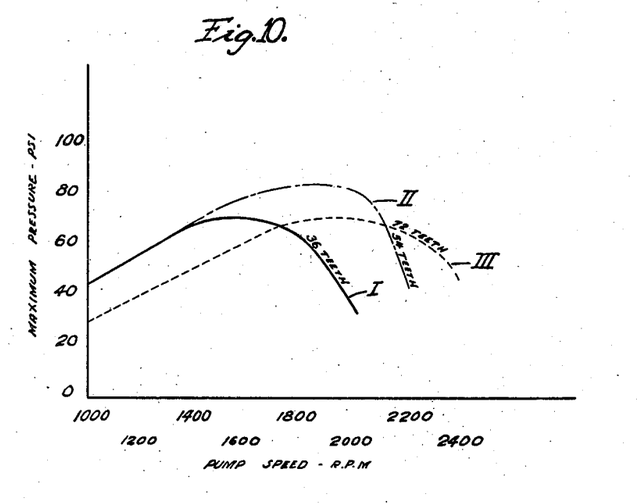
Figs. 10 and 11 are explanatory diagrams.

The speed at which the impeller is driven is an important factor in operating, the optimum speed being related to the spacing of the teeth. This relation can be readily determined experimentally by plotting delivery pressures against pump speeds. In Fig. 10, three curves, showing this relation for the pump, are drawn, each having a different spacing of impeller teeth. These curves are denoted respectively I, II, and III, the curve I being drawn for an impeller having 36 teeth about its circumference on one side. Here it is seen that a maximum delivery pressure of approximately 72 pounds per square inch gauge is attained at a speed of 1600 R. P. M. Curve II is drawn for a tooth spacing of 54 for an impeller of the same diameter as shown in that for curve I. Here it is seen that a maximum delivery pressure of 85 pounds per square inch gauge is attained at a speed of 1900 R. P. M. Curve III is similarly drawn for 72 teeth on the impeller, and while the curve shows a maximum delivery pressure at a somewhat greater speed than curve II, the actual delivery pressures are less at every point. In this way, the optimum performance of the pump may be ascertained.

Figure 11:
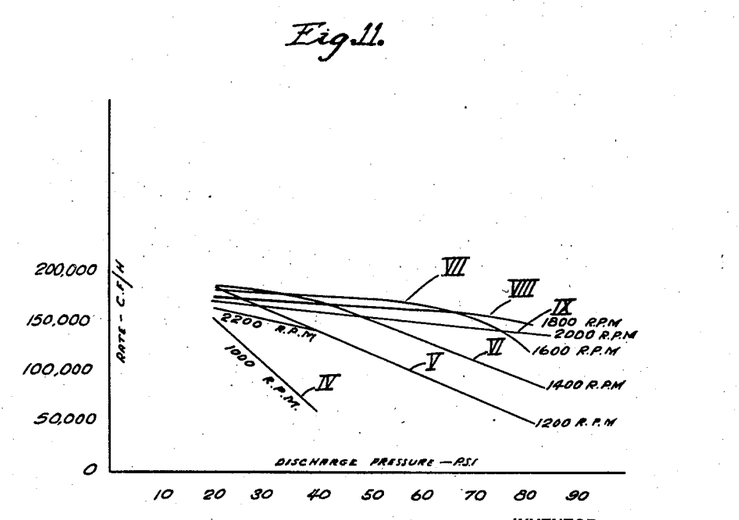

The optimum speed of the pumps of the present invention may be also determined experimentally, for example, from curves drawn showing the delivery rate per hour plotted against discharge pressures for various speeds. Such curves are shown in Fig. 11, where abscissae show discharge pressures, the ordinates showing the rate of liquid discharged, measured as cubic feet of gas per hour. Curve IV is drawn for a pump speed of 1000 R. P. M. and shows a very sharp fall in discharge rate with increase of discharge pressure. Curve V shows similar performance for a speed of 1200 R. P. M. and indicates an increase in head at such speed. Curve VI is similarly drawn for a speed of 1400 R. P. M. and shows a further increase in pressure. Curve VII is drawn for a speed of 1600 R. P. M. and shows a relatively constant rate of high delivery over a wide range of delivery pressures and may be taken as indicating an optimum performance of the pump. The curve VIII, which is drawn for a speed of 1800 R. P. M., shows less capacity for the various discharge pressures, although at this higher speed the discharge capacity at the highest pressures is better sustained. Another curve IX is drawn for a speed of 2000 R. P. M. and shows similar characteristics to that at 1800 R. P. M. but has a slightly less capacity.

The pump provided by the present invention is thus seen to operate with a relatively high head and, in comparison with work done in transferring a like amount of material in the gas phase by a reciprocating pump, consumes a relatively small amount of power.

Figure 9:
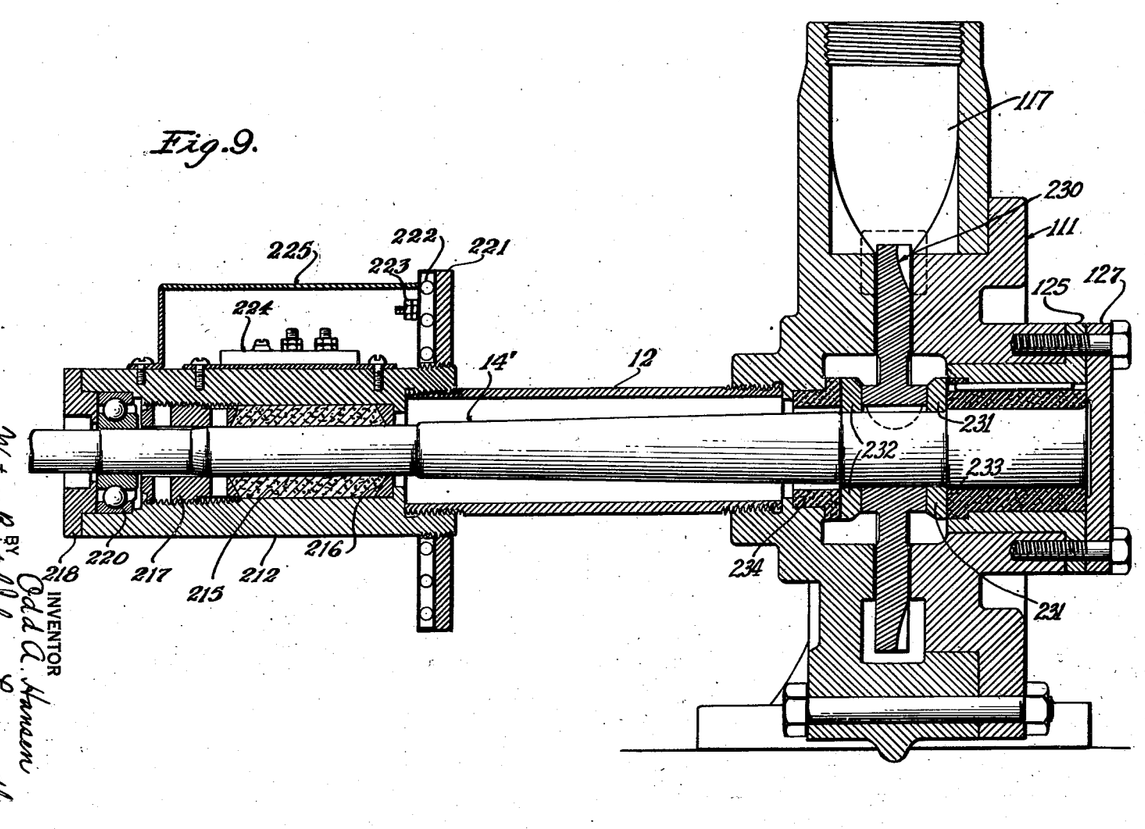
Fig. 9 is another enlarged vertical sectional view showing a modified form of pump constructed in accordance with the invention.

In the modification shown in Fig. 9, a combined packing and bearing is provided in the end of extension 12 for shaft 14', such combination being in the form of an auxiliary extension or separable sleeve 212 attached to the end of the extension 12, which in this form of the invention is preferably made shorter than that previously described. Here sleeve 212 carries gland rings 216 and 217 between which a packing 215 is compressed; the pressure being had in this case from the turning of ring 217 which is in threaded engagement with the outer bore of sleeve 212. The inner ring 216 is here supported by a shoulder at the inner end of sleeve 212.

The bore of sleeve 212 is enlarged at the outer end to a diameter greater than that which is threaded for the reception of ring 217 in order that it may receive and support a bearing member. Such bearing is shown at 220 in Fig. 9 and held in place by a closure member 218.

In this modification, the lubricant may become so stiff when the pump is stopped that difficulty may be experienced in starting. Hence means are preferably provided for heating the auxiliary extension and its contents including the bearing. To this end, a supporting plate 221 is mounted on the extension by suitable means, such as a threaded bore fitted onto the inner end of the sleeve 212 and provided with heating means 222, for example, an electric heating coil. The coil here shown has binding posts 223 through which connections may be made to a base or panel 224, on which one or more control devices, such as a switch or thermostat, may be mounted; the panel being shown as mounted exteriorly on sleeve 212 and housed by a casing 225.

In this form of the invention, the proper clearance and spacing of the impeller 230 is again achieved by the use of independently mounted thrust bearings shown respectively at 231 and 232. The former bears directly against the bushing 233 while the latter has a bushing 234 for supporting the same. The collars 231 and 232 here are preferably of steel while the bushings 233 and 234 are of bonded graphite.

While bushings 233 and 234 are here shown as integral members, each provided with a shoulder that determines the depth to which the bushing may be pushed into the recess which receives it, such integral structure is by no means necessary to the practice of the invention, the use of a bushing comprising a cylindrical portion and a separate annulus with outside diameter greater than that of the cylinder being also contemplated.

It will also be seen that while the principles here employed to pump a nearly boiling liquid against a head of pressure have been illustrated in connection with a single-stage pump, the head being of the order of 85 p. s. i. gauge or less, as may be ascertained from the data in Figs. 10 and 11, it is practical to design pumps of materially greater capacities in the single stage. Pumps in accordance with the invention have been made which attain 150 p. s. i. gauge in a single stage. The application of such principles is not limited to single-stage pumps and may be extended to multi-stage pumps, pumping against pressures of 400 lbs. per square inch gauge or thereabouts.

Since certain changes in carrying out the above method and in the constructions set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. The method of pumping a volatile liquid having a boiling point temperature below 233° K. at atmospheric pressure, which comprises supplying the liquid to the pump intake under a pressure sufficiently greater than the equilibrium pressure corresponding to the temperature of the liquid to avoid immediate ebullition, inducting the liquid to be entrained into a pumping channel through an entrance of smooth character free of sharp bends or corners in the direction of liquid flow avoiding substantial turbulence, entraining the liquid inducted in said channel by a bladed rotor, impelling the liquid entrained in said pumping channel at a velocity such that the amount of turbulence is below a critical value at which the liquid would flash into vapor in the pumping channel, and discharging the liquid entrained when conveyed a distance such as to attain a desired delivery head.

2. The method of pumping a volatile liquid having a boiling point temperature below 233° K. at atmospheric pressure against a moderate head of pressure, which comprises supplying the liquid to the pump intake under a pressure sufficiently greater than the equilibrium pressure corresponding to the temperature of the liquid to avoid immediate ebullition, inducting the liquid to be entrained through an entrance of smooth character free of sharp bends or corners in the direction of liquid flow avoiding substantial turbulence into a pumping channel of uniform cross-section, entraining the liquid inducted in said channel by a bladed rotor, impelling the liquid entrained in said pumping channel at a velocity such that the amount of turbulence is below a critical value at which the liquid would flash into vapor when carried into the suction, suppressing substantial leakage of liquid past the rotor, and discharging the liquid entrained when conveyed a distance such as to attain a desired delivery head.

3. The method of pumping a volatile liquid having a boiling point temperature below 233° K. at atmospheric pressure, which comprises supplying the liquid to the pump under a relatively low static head from a source elevated a substantial distance above the pump to provide a pressure at the pump intake sufficiently greater than the equilibrium pressure corresponding to the temperature of the liquid to avoid immediate ebullition, inducting the liquid to be entrained into a pumping channel through an entrance of smooth character free of sharp bends or corners in the direction of liquid flow avoiding substantial turbulence, entraining the liquid inducted in said channel by a bladed rotor, impelling the liquid entrained in said pumping channel at a velocity such that the amount of turbulence is below a critical value at which the liquid would flash into vapor in the pumping channel, and discharging the liquid entrained when conveyed a distance such as to attain a desired delivery head.

4. The method of pumping a volatile liquid having a boiling point temperature below 233° K. at atmospheric pressure against a moderate head of pressure, which comprises supplying the liquid to the pump intake under a pressure sufficiently greater than the equilibrium pressure corresponding to the temperature of the liquid to avoid immediate ebullition, inducting the liquid to be entrained into a pumping channel through an entrance of smooth character free of sharp bends or corners in the direction of liquid flow avoiding substantial turbulence, entraining the liquid inducted in said channel by a bladed rotor, initially cooling and priming the pump by admission of liquid and temporarily bypassing the pump discharge to a point of relatively low pressure to dispose of the gas generated in cooling the pump, then directing the pump discharge to the normal receiving means under elevated pressure while impelling the liquid entrained in said pumping channel at a velocity such that the amount of turbulence is below a critical value at which the liquid would flash into vapor in the pumping channel, and discharging the liquid entrained when conveyed a distance such as to attain a desired delivery head.

5. The method of pumping a volatile liquid having a boiling point temperature below 233° K. at atmospheric pressure against a moderate head of pressure, which comprises supplying the liquid to the intake of turbine type pump under a pressure sufficiently greater than the equilibrium pressure corresponding to the temperature of the liquid to avoid immediate ebullition, inducting the liquid to be entrained into a pumping channel through an entrance of smooth character free of sharp bends or corners in the direction of liquid flow avoiding substantial turbulence, entraining the liquid inducted in said channel by a bladed rotor, initially cooling and priming the pump by by-passing the pump discharge back to the supply for a period sufficient to dispose of the gas generated in cooling the pump, then closing the by-pass and directing the pump discharge to the normal receiving means under elevated pressure while impelling the liquid entrained in said pumping channel at a velocity such that the amount of turbulence is below a critical value at which the liquid would flash into vapor when carried into the suction, and discharging the liquid entrained when conveyed a distance such as to attain a desired delivery head.

6. In a pumping system embodying a turbine type pump adapted to effect transfer of a volatile liquid having a boiling point temperature below 233° K. at atmospheric pressure, the combination of a bladed rotor adapted to be power driven, a casing therefor having a pumping channel operatively disposed about said rotor and provided with an inlet which in the direction of liquid flow is free of sharp bends and corners and merges smoothly into said pumping channel, the blades of said rotor being disposed about its circumference and extending into said channel, means for supplying the liquid to the pump intake under a pressure sufficiently greater than the equilibrium pressure corresponding to the temperature of the liquid to avoid immediate ebullition, and a shaft for driving said rotor journaled in said casing, said rotor being designed to be driven at a velocity such that the amount of turbulence in the liquid is below a critical value at which the liquid would flash into vapor in the pumping channel.

7. In a pumping system embodying a turbine type pump adapted to effect transfer of a volatile liquid having a boiling point temperature below 233° K. at atmospheric pressure, the combination of a bladed rotor adapted to be power driven, a casing therefor having a pumping channel operatively disposed about said rotor and provided with an inlet which in the direction of liquid flow is free of sharp bends and corners and merges smoothly into said pumping channel, the blades of said rotor being disposed about its circumference and extending into said channel, means for supplying the liquid to the pump intake under a pressure sufficiently greater than the equilibrium pressure corresponding to the temperature of the liquid to avoid immediate ebullition, a shaft for driving said rotor journaled in said casing, and means for temporarily by-passing the pump discharge to a point of relatively low pressure to effect initial cooling and priming of the pump, said rotor being designed to be driven at a velocity such that the amount of turbulence in the liquid during normal pumping is below a critical value at which the liquid would flash into vapor in the pumping channel.

8. In a turbine type pump adapted to effect transfer of a volatile liquid having a boiling point temperature below 233° K. at atmospheric pressure, the combination with a bladed rotor adapted to be power driven, of a casing therefor having inlet and outlet passages and a connecting pumping channel circumferentially disposed about said rotor, said inlet having a contour in the direction of liquid flow free of sharp bends and merging smoothly into said pumping channel, the blades of said rotor extending into said pumping channel, a shaft for said rotor having one end journaled in said casing, a tubular extension on said casing through which said shaft extends outwardly for a driving connection, and shaft sealing means at the outer end of said extension, said extension being of considerable length sufficient to impede to a substantial degree transfer of heat therethrough whereby heat leakage therethrough into the pump from said seal is kept low and said seal is maintained sufficiently warm for efficient operation.

9. In a pumping system embodying a turbine type pump adapted to effect transfer of a volatile liquid having a boiling point temperature below 233° K. at atmospheric pressure, the combination of a bladed rotor adapted to be power driven, a casing therefor having a pumping channel operatively disposed about said rotor and provided with an inlet which in the direction of liquid flow is free of sharp bends and corners and merges smoothly into said pumping channel, the blades of said rotor at its circumference extending into said channel, means for supplying the liquid to the pump intake under a pressure sufficiently greater than the equilibrium pressure corresponding to the temperature of the liquid to avoid immediate ebullition, a shaft for driving said rotor having one end completely enclosed and journaled in said casing, a tubular housing member extending from said casing, said shaft extending outwardly therethrough for a driving connection, an externally mounted bearing for the outer end of said shaft spaced from the outer end of said tubular housing member, and a shaft sealing means at the outer end of said tubular member, said tubular member being of considerable length sufficient to impede to a substantial degree transfer of heat therethrough whereby heat leakage therethrough into the pump from said seal is kept low and said seal is maintained sufficiently warm for efficient operation.

10. In a pumping system embodying a rotary type pump adapted to effect transfer of a volatile liquid having a boiling point temperature below 233° K. at atmospheric pressure, the combination with a bladed rotor adapted to be power driven, of a casing therefor having inlet and outlet passages and a connecting pumping channel circumferentially disposed about said rotor with the blades of said rotor operative therein, said inlet having a contour in the direction of liquid flow of gradually reduced size free of sharp bends and merging smoothly into said pumping channel, means for supplying the liquid to the pump intake under a pressure sufficiently greater than the equilibrium pressure corresponding to the temperature of the liquid to avoid immediate ebullition, a shaft for said rotor having one end completely enclosed and journaled in said casing, said shaft extending outwardly from said casing for a driving connection, bearing means in said casing for said enclosed shaft end of solid self-lubricating material, an external bearing for the outer end of said shaft spaced from and free of said casing, and sealing means for said shaft spaced inwardly from said external bearing.

11. In a pumping system embodying a rotary type pump adapted to effect transfer of a volatile liquid having a boiling point temperature below 233° K. at atmospheric pressure, the combination with a bladed rotor adapted to be power driven, of a casing therefor having inlet and outlet passages and a connecting pumping channel circumferentially disposed about said rotor with the blades of said rotor operative therein, said inlet having a contour in the direction of liquid flow of gradually reduced size free of sharp bends and merging smoothly into said pumping channel, means for supplying the liquid to the pump intake under a pressure sufficiently greater than the equilibrium pressure corresponding to the temperature of the liquid to avoid immediate ebullition, a shaft for said rotor having one end completely enclosed and journaled in said casing, bearing means in said casing for said enclosed shaft end of solid self-lubricating material, an extension on said casing through which said shaft extends outwardly for a driving connection, and shaft sealing means at the outer end of said extension, said extension being of considerable length sufficient to impede to a substantial degree transfer of heat therethrough whereby heat leakage therethrough into the pump from said seal is kept low and said seal is maintained sufficiently warm for efficient operation.

ODD A. HANSEN.